Jan. 10, 1956

D. GIACOSA 2,730,185

MOTOR VEHICLE WITH FORWARDLY MOUNTED ENGINE

Filed June 27, 1950

Inventor
Dante Giacosa
By Robert E Burns
Attorney

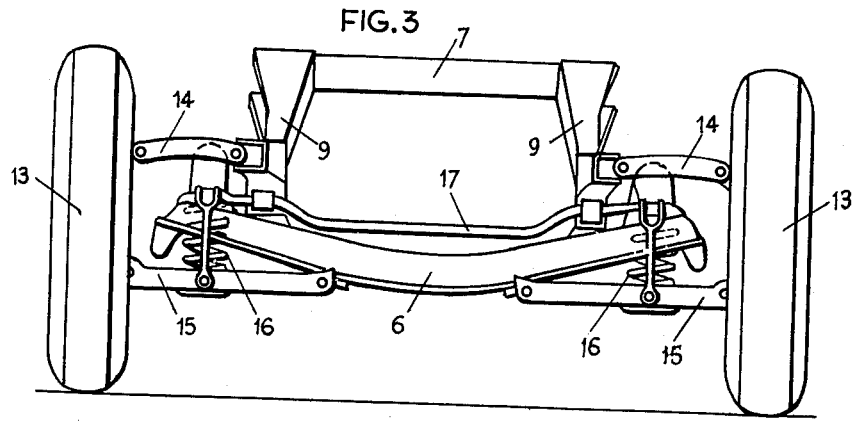
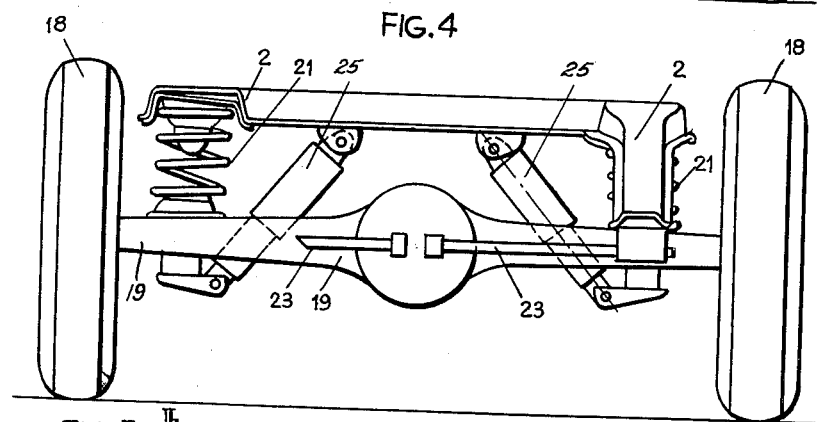
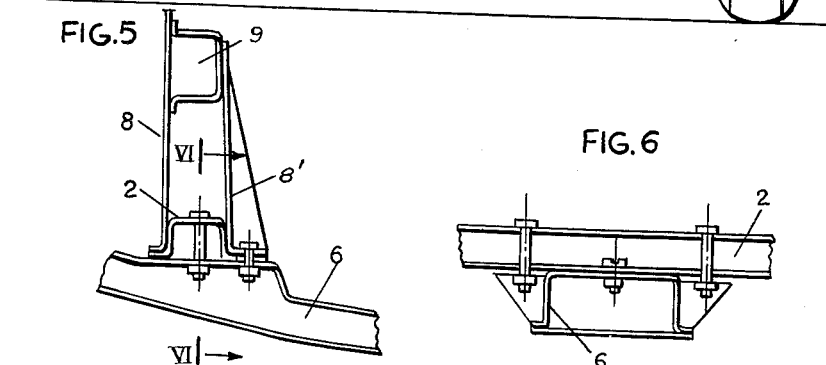
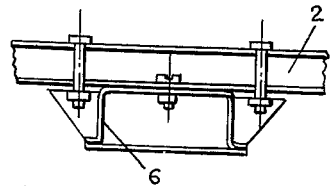
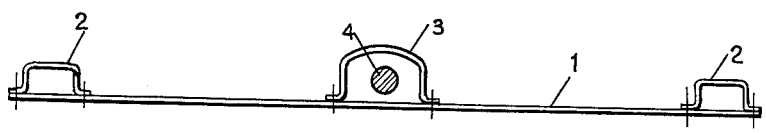

United States Patent Office 2,730,185
Patented Jan. 10, 1956

2,730,185
MOTOR VEHICLE WITH FORWARDLY MOUNTED ENGINE

Dante Giacosa, Turin, Italy, assignor to Fiat S. p. A., Turin, Italy

Application June 27, 1950, Serial No. 170,617

Claims priority, application Italy June 30, 1949

1 Claim. (Cl. 180—64)

This invention relates to vehicle frames. Its object is to provide a frame structure by which the engine may be advantageously arranged in the front vehicle portion and roominess of the vehicle is combined with stiffness of the frame.

Another object of the invention is to provide a frame which consists of a sheet metal platform having secured thereto channel-shaped sheet metal members which, once attached to the platform, form box-shaped members extending longitudinally in the central frame portion almost flush with the wheels and converge at their front and rear ends towards the axis of the frame.

A further object of the invention is to provide a frame which is connected at the front with a front cross member which is curved, as seen in plan, towards the rear vehicle portion and extends through a recess formed in the engine sump.

Still another object of the invention is to provide a frame at the front portion of which is arranged a cross bar formed by sheet metal bent to channel form and arranged in spaced relationship over the platform, said cross bar being supported by longitudinal inclined members of sheet metal merging into the longitudinal members of the frame, the front cross member, the longitudinal members of the frame and the longitudinal supporting members being rigidly secured together by means of side plates.

Further features of the frame will be obvious from the following specification referring to the accompanying drawing which shows an embodiment of the invention by way of example.

Figure 3 is a part front view;

Figure 4 is a section on line IV—IV of Fig. 2;

Figure 5 is a section on an enlarged scale on line V—V of Figure 2;

Figure 6 is a section on line VI—VI of Figure 5, and

Figure 7 is a section on line VII—VII of Figure 2.

Figure 1:
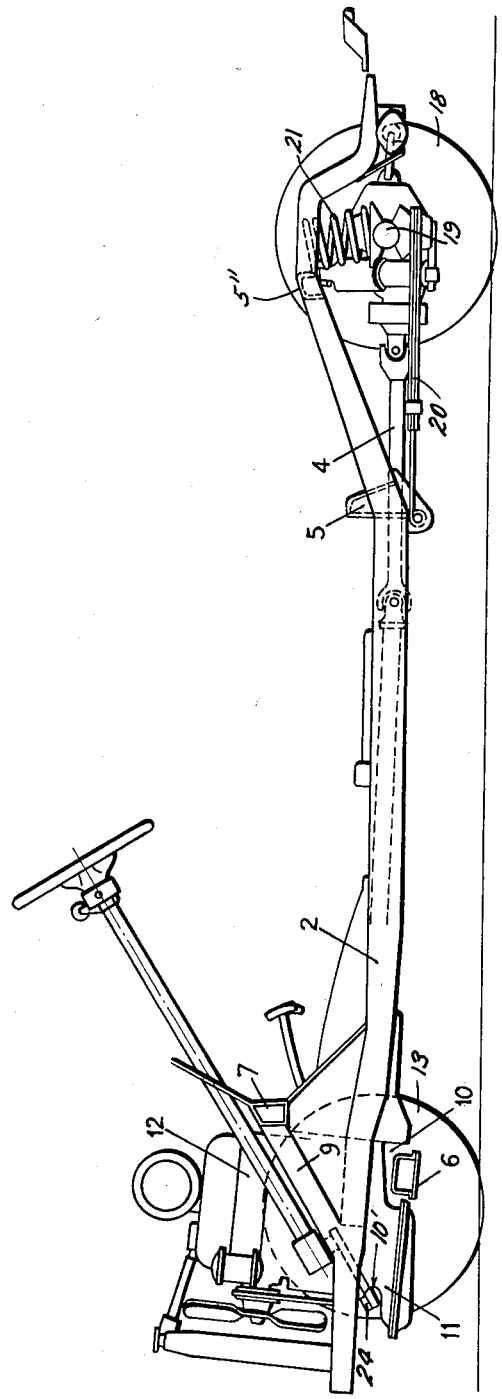
Figure 1 is a side view partly in longitudinal section of the frame.
Figure 2:
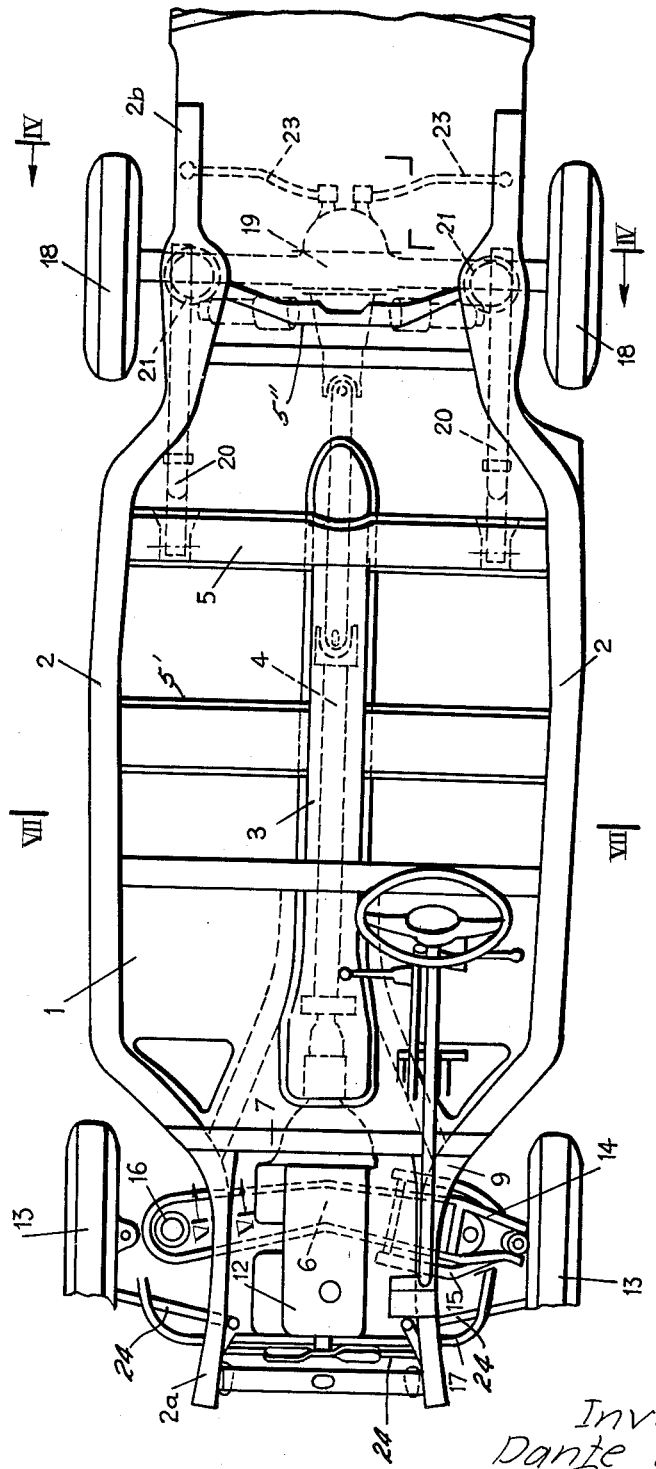
Figure 2 is a plan view.

The frame comprises a sheet metal platform 1 and channel-shaped sheet metal members 2 attached to the longitudinal edges of the platform and replacing the longitudinal members.

The members 2 are rectilinear at their central portion and almost flush with the outline of the vehicle wheels, and converge at the front and rear through curved connections towards the vehicle center line, as shown at 2a and 2b.

A member 3 forming the housing for the transmission shaft 4 is secured to the central portion of the member 1.

5, 5' and 5'' denote cross members stiffening the frame 1, and 6 denotes the front cross member, which is of a characteristic profile and bent in plan towards the rear vehicle portion.

7 denotes a cross bar arranged at the level of the lower edge of the dashboard and supported by means of channel shaped members 9 inclined downwardly and merging into the longitudinal member 2 of the frame. The channel shaped members 9, the longitudinal members 2 of the frame, and the cross member 6, are rigidly connected together by means of lateral plates 8, 8'.

The front cross member extends through a recess 10 in the sump 11 in the engine 12. The sump is moreover formed with a front recess 10' for the linkage 24 of the steering gear.

The front wheels 13 are carried by articulated links 14, 15 pivotally attached to the frame and front cross member. The resilient means for the suspension are in the form of two coiled springs 16 and cross bar 17.

The rear wheels 18 are carried by the driven axle 19 which is connected to the frame through longitudinal struts 20, coiled springs 21 and two cross bars 23. This suspension is described in a co-pending application Serial No. 170,616 filed June 27, 1950, for Rear Suspension for Motor Vehicles.

25 denotes the shock absorbers for the rear suspension. The width of the intermediate portion frame between the front and rear axles of the vehicle is not less than the wheel track width, i. e., the spacing between the middle planes normal to the axes of rotation of front and rear vehicle wheels, respectively.

What I claim is:

In a motor vehicle, a frame having spaced arms extending forwardly to the front of the vehicle, the distance between the outside edges of said arms being substantially less than the track width of the vehicle, a beam extending transversely of said arms and having end portions connected to opposite intermediate portions of said arms, said beam having a central portion disposed at a level below the level of said end portions and being curved in the direction of the rear of the vehicle, steerable front wheels suspended from the ends of said beam, an engine disposed in the space between said arms and extending longitudinally of the vehicle directly above said beam, a steering linkage for the front wheels disposed forwardly of said beam, and an oil sump depending from said engine and extending into the space between the steering linkage and said beam, said oil sump having a forward recessed portion for accommodating said steering linkage and a rearward recessed portion for accommodating said beam, said oil sump thereby having portions extending forward and downwardly of said steering linkage, and rearwardly of said beam.

References Cited in the file of this patent

UNITED STATES PATENTS

| | | |
|---|---|---|
| 2,028,549 | Lord | Jan. 21, 1936 |
| 2,126,607 | Boehner | Aug. 9, 1938 |
| 2,226,790 | Valletta | Dec. 31, 1940 |
| 2,266,116 | Best | Dec. 16, 1941 |
| 2,373,356 | Thoms et al. | Apr. 10, 1945 |
| 2,485,500 | Lyman | Oct. 18, 1949 |

FOREIGN PATENTS

| | | |
|---|---|---|
| 543,885 | Great Britain | Mar. 18, 1942 |
| 895,132 | France | Mar. 27, 1944 |
| 895,192 | France | Mar. 27, 1944 |

OTHER REFERENCES

"The Automobile Engineer," April 1939, page 118.